United States Patent [19]
Collins

[11] Patent Number: 4,823,465
[45] Date of Patent: Apr. 25, 1989

[54] LINE FEED MECHANISM FOR LINE TRIMMERS

[75] Inventor: Imack Collins, Shreveport, La.

[73] Assignee: White Consolidated Industries, Inc., Cleveland, Ohio

[21] Appl. No.: 126,824

[22] Filed: Nov. 30, 1987

Related U.S. Application Data

[63] Continuation of Ser. No. 943,309, Dec. 17, 1986, abandoned.

[51] Int. Cl.⁴ .............................................. B26B 7/00
[52] U.S. Cl. ........................................ 30/276; 56/127
[58] Field of Search ................... 30/276, 347; 56/12.7, 56/295

[56] References Cited

U.S. PATENT DOCUMENTS

| | | |
|---|---|---|
| 4,047,299 | 9/1977 | Bair . |
| 4,134,204 | 1/1979 | Perdue . |
| 4,151,646 | 5/1979 | Lane . |
| 4,161,820 | 7/1979 | Moore . |
| 4,167,812 | 8/1979 | Moore . |
| 4,168,572 | 9/1979 | Ewing . |
| 4,183,138 | 1/1980 | Mitchell et al. ............... 30/276 |
| 4,189,833 | 2/1980 | Kwater . |
| 4,203,212 | 5/1980 | Proulx . |
| 4,236,309 | 12/1980 | Cayou . |
| 4,236,311 | 12/1980 | Mitchell . |
| 4,259,782 | 4/1981 | Proulx . |
| 4,274,201 | 6/1981 | Oberg et al. . |
| 4,412,382 | 11/1983 | White, III . |
| 4,458,419 | 7/1984 | Proulx . |
| 4,490,910 | 1/1985 | Mattson et al. . |
| 4,633,588 | 1/1987 | Pittinger, Jr. . |
| 4,672,798 | 7/1987 | Ota . |

Primary Examiner—Frank T. Yost
Assistant Examiner—Willmon Fridie, Jr.
Attorney, Agent, or Firm—Hubbard, Thurman, Turner & Tucker

[57] ABSTRACT

The cutting head assembly of a motor-driven flexible line trimmer has a line feed mechanism which includes a housing member connected to and driven by a drive shaft from the prime mover and having a centrally located cylindrical wall for receiving a compression spring. A locking plate and cup member is reciprocably disposed around the cylindrical wall and compresses the spring substantially to its normal running position where it is held in position relative to the housing member by suitable retention structure. A spool is disposed around the cup portion of the locking plate and cup member and unless restrained, is free to rotate relative to the housing member to pay out line through an aperture in the housing member. A cover ring member has a central opening which is coupled to the housing member and holds a ground engaging button member against the lower end of the cup member. The upper and lower faces of the spool have radially extending ribs which cooperate with locking teeth on the lower face of the locking plate and escapement teeth on the upper edge of the button member to lock the spool against rotation when the locking plate and cup member are in the lower, normal running position, and to permit the spool to rotate through a controlled increment when the button is bumped against the ground and thus reciprocated, along with the locking plate member, upwardly then downwardly as a result of the biasing force of the spring.

18 Claims, 4 Drawing Sheets

LINE FEED MECHANISM FOR LINE TRIMMERS

This is a continuation of application Ser. No. 943,309, filed Dec. 17, 1986, now abandoned.

FIELD OF THE INVENTION

This invention relates generally to flexible line trimmers, and more particularly relates to a head assembly for containing a supply of line and for feeding the line out in controlled increments when the head assembly is pushed against the ground by the operator.

BACKGROUND OF THE INVENTION

Over the past decade, a class of flexible line cutting devices for trimming grass and other vegetation around trees, fences and the like, or edging along sidewalks and the like, has achieved widespread acceptance in the marketplace. These devices usually contain a supply of monofilament nylon line stored on a spool with a free end extending from an aperture in a head rotating at typically between 3,000–8,000 r.p.m. A number of systems have been devised to maintain a cutting swath having a diameter of from 12 to 20 inches for various motors of different power is typical. So long as the spool and housing rotate at the same speed, no additional line is payed out. However, when the spool is allowed to rotate relative to the housing, or the housing to rotate relative to the spool, an additional length of line is payed out to replenish the line as it is lost due to wear or breakage.

The so-called bump-feed system is the most widely used to control the payout of line to maintain the desired cutting length. In one type of device typified by U.S. Pat. Nos. 4,183,138 and 4,274,201, for example, the housing is driven by the drive shaft of the prime mover and the storage spool is disposed to reciprocate along the axis of rotation relative to the housing, first upwardly in response to tapping a member connected to the spool against the ground, and then downwardly in response to a spring biasing the spool back to the normal running position. An escapement mechanism limits the maximum relative rotation between the housing and the spool to thereby limit the amount of line payed out. When urged to the upward position by engagement with the ground the spool is released from a first set of locking teeth and allowed to rotate a short increment as a result of the centrifugal force pulling on the line which s being rotated in the cutting plane before engaging a second set of escapement teeth which prevents further rotation. Upon being returned by the spring to the lower position, the spool is allowed to rotate an additional predetermined increment before again being restrained by the lower set of escapement teeth, thus paying out a controlled increment of line. The operator may repeat this procedure as often as required while operating the device.

In another similar device, such as disclosed in U.S. Pat. No. 4,189,833, the spool is driven by the prime mover and the housing is reciprocated axially relative to the spool to achieve indexing and line payout.

In yet a third distinct class of bump feed devices is represented by the device disclosed in U.S. Pat. No. 4,236,309, where neither the spool nor housing is axially reciprocated, but a third member is reciprocated to achieve payout. These devices are significantly more complex and expensive to fabricate, assemble, and to replace an exhausted supply of line.

In the first described system, drive power is coupled from the shaft to the housing, then through the escapement teeth to the spool and associated ground bumping mechanism. In the second system, power is applied from the shaft to the spool, then through the tooth mechanism to the housing. In each system, the spring must be disposed between the housing and the spool, tending to urge one downwards from the other. When the supply of cutting line on the spool is exhausted, the device must be disassembled by removing either the spool from the driven housing or the housing from the driven spool. In either case, the spring disposed between the two must also be removed. Line is then either rewound on the spool, or a new spool with line is used. The line is first threaded through the aperture in the housing, then the housing and spool urged into position by compressing the spring. The difficulty of threading the line from the spool through the aperture while inserting the spool into the housing against the force of the spring is a difficult and substantial and inconvenience for many customers. Further, for effective manufacturing costs, it is desirable for a head to be usable when driven in either direction of rotation, with the line wound on the spool in either direction.

The present invention is concerned with an improved head assembly for dispensing a monofilament line in response to the operator bumping the head against the ground which has an arrangement of components that is cost effective to fabricate and assemble, but in which a new supply of line on a spool can be conveniently replaced without having to disassemble the portion of the unit including the biasing spring, and without having to significantly compress the spring during assembly. The arrangement of components also permit cam surfaces which are located relatively remote from the axis of the head, and thus have maximum leverages which results in minimum forces tending to wear and destroy the device.

SUMMARY OF THE INVENTION

In accordance with the present invention, a housing means including a housing member connected to and driven by a drive shaft from the prime mover and having a centrally located cylindrical wall for receiving a compression spring. A locking plate and cup member is reciprocally disposed around the cylindrical wall and compresses the spring substantially to its normal running position where it is held in position relative to the housing member by suitable retention means. A spool is disposed around the cup portion of the locking plate and cup member and unless restrained, is free to rotate relative to the housing member to payout line through an aperture in the housing member. A cover ring member completes the housing means and has a central opening which is coupled to the housing member and holds a ground engaging button member against the lower end of the cup member when both are in the lower, normal running position, yet permits the button member to reciprocate upwardly against the locking plate and cup member to compress the spring when the button member is bumped against the ground. The locking plate and cup member is driven by the housing member while being permitted to reciprocate axially, while the button member is driven by the cover ring member by way of the housing member while also permitting the button member to reciprocate axially. The spool is held against axial reciprocation by the cover member and the housing member in a manner to permit rotation of the spool relative to the hosing. The upper and lower faces of the spool having radially extending ribs which cooperate with locking teeth on the lower face of the locking plate and escapement teeth on the upper edge of the button member to lock the spool against rotation when the locking plate and cup member are in the lower, normal running position, and to permit the spool to rotate through a controlled increment when the button is bumped against the ground and thus reciprocated, along with the locking plate member, upwardly then downwardly as a result of the biasing force of the spring. The spool may be replaced merely by removing the cover ring and button members from the housing.

In one embodiment of the invention, the locking plate and cup member is retained in place substantially in its lowermost position by retention means carried by the outer wall of the housing means. This may conveniently comprise a metal eyelet inserted in the aperture of the housing member through which the line extends into the cutting plane. As is well known, a metal bearing surface for the plastic line is essentially required to prevent friction welding of the plastic line to the plastic housing member. The full spool may then be replaced and the cover, with the button member therein, coupled to the housing without fighting the force of the spring. This procedure requires minimum mechanical knowledge and manual dexterity on the part of the operator. An alternative retention means is connected to the center section of the housing member and passed through a central aperture in the locking plate and cup member, with a suitable head below the aperture to hold the locking plate and cup members in place when the cover ring member and button member are removed to replace the spool and line.

Another important advantage of the present invention is that the system can be operated in either direction of rotation merely by providing an appropriate coupling to the prime mover. Further, operation is not affected by the direction in which the line is wound on the spool.

Figure 1:
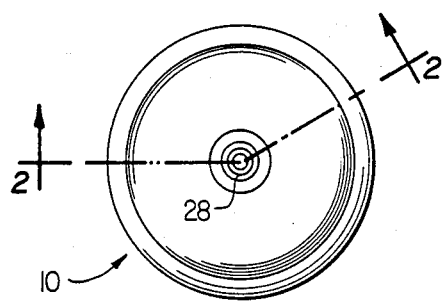
FIG. 1 is a top view of a head constructed in accordance with the present invention.

Referring now to the drawings, a head assembly in accordance with the present invention is indicated generally by the reference numeral 10. The head assembly 10 is comprised of five injection molded plastic parts including a main housing member, indicated generally by the reference numeral 12, a locking plate and cup member, indicated generally by the reference numeral 14, a spool, indicated generally by the reference numeral 16, a lower cover member, indicated generally by the reference numeral 18, and a ground engaging button member, indicated generally by the reference numeral 20. In addition, there are three metallic parts, including an arbor 28, a coil compression spring 30, and an eyelet 32, for a total of eight parts.

The upper housing 12 has a central bore 33 which receives the arbor 28. The arbor has internal threads 34 which are threaded onto a drive shaft (not illustrated) of a conventional line trimmer, and an external spline 35 which is received in a mating portion of the housing 12 to provide a positive drive. One important advantage of this invention is that the arrangement of parts permits the head to be operated while rotating in either direction by various prime movers merely by reversing the direction of the threads 34 in the arbor.

The housing 12 includes outer and inner cylindrical walls 36 and 38, respectively, which merge into a narrowed portion of the double wall 40a to receive the metallic eyelet 32 through which the cutting line 44 extends into the cutting plane. A cylindrical inner wall forms chamber 46 for the coil spring 30. The upper locking plate and cup member 14 has a cup-like portion 50 which is slidably disposed around the tubular wall 46 of the housing so that the coil spring 30 is compressed between the lower closed end 52 of the cup-shaped portion and the lower end of the arbor 28. The member 14 includes a disc-shaped upper locking plate 53 which extends as a tab portion 54 (see also FIG. 4) radially outwardly to a point above the flanged edge 32a of the eyelet 32. The eyelet flange 32a retains the locking plate and cup member 14 substantially in the assembled position illustrated in FIG. 3, when the unit is disassembled by interfering with the downward movement of the tab portion 54 of the locking plate.

The cover ring 18 includes a peripheral flange portion 55 which is disposed around the lower end of the outer cylindrical wall 36 of the housing and may be locked in place by any suitable conventional means, but preferably by three tabs 56 (see FIG. 4) which project outwardly from the lower end of the outer peripheral wall 36 into three mating grooves 58 in the cover ring. The three tabs 56 pass into the openings 60 adjacent the slots 58 as the cover ring is moved axially relative to the housing, then rotated to move the tabs 56 into the grooves to prevent axial displacement. A locking tab 62 is biased inwardly as the tabs are forced into the openings 60, then springs back into position to prevent relative rotation and lock the tabs 56 in the grooves 58. To remove the cover rings, the locking tab is depressed to permit the cover to be rotated and move the tabs back from the grooves 58 to the openings 60. This structure has been in commercial use for a number of years and does not, per se, constitute a portion of the present invention. Any other suitable means for removedly locking the cover to the housing may be employed.

The ground engaging button 20 projects through an axially centered opening 60 in the cover ring 18 and has a central cup-shaped portion 61 adapted to mate with the lower end of the locking plate and cup member 14. The button member 20 includes radially outwardly extending circumferential flange portion 64 which projects beyond the boundary of the opening 60. The parts are so dimensioned that when the cover plate 18 is attached to the housing 12 with the tabs 56 received in the grooves 58, the button member 20 engages the lower end of the locking plate and cup member 14 so that the cover plate engages the flange 64 and forces the button member against the bottom of the locking plate and cup member 14 to preferably slightly compress the spring, which results in the tab 54 being moved from contact with the eyelet to the slightly spaced position illustrated in FIG. 2.

Figure 4:
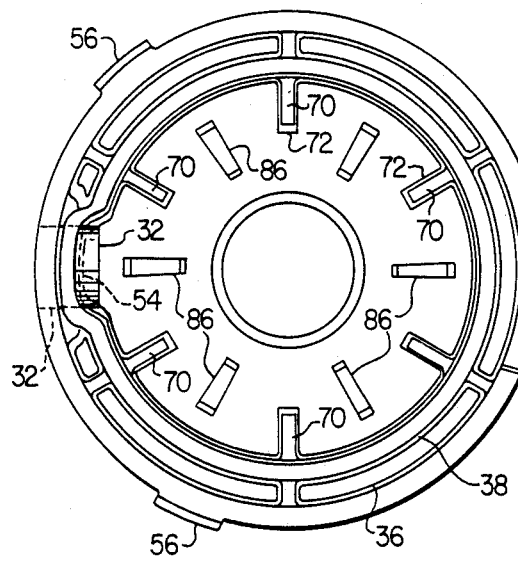
FIG. 4 is a bottom view of the locking plate and cup member together with the housing member of the assembly of FIG. 3, the vantage point being represented by line 4—4 on FIG. 3.
Figure 6:
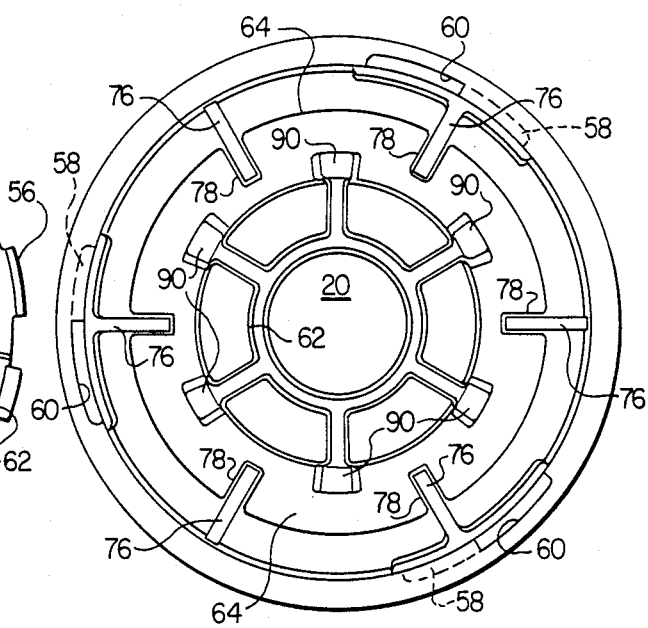
FIG. 6 is a top view of the lower cover ring member and ground engaging button member of FIG. 3, the vantage point being represented by lines 6—6 of FIG. 3.

The upper locking plate and cup member 14 are driven by the housing 12 by six ribs 70 which are received in cooperating slots 72 in the upper locking plate as best illustrated in FIG. 4. This arrangement transmits torque from the housing to the locking plate and cup member 14 while permitting the member 14 to reciprocate axially as required for operation. Similarly, as best seen in FIG. 6, the button member 20 is keyed to the cover ring 18 by six ribs 76 on the cover ring 18 which are received in grooves 78 in the button member 20. The lower end of the ribs 70 of the housing 12 and the upper end of the ribs 76 of the cover ring 18 are dimensioned, when assembled, to prevent axial movement of the spool relative to the housing by contacting the peripheral flanges 80 and 82, respectively, of the spool 16. This condition is important in that the spool must be held against axial movement relative to the housing for good operation as will presently be evident.

Figure 3:
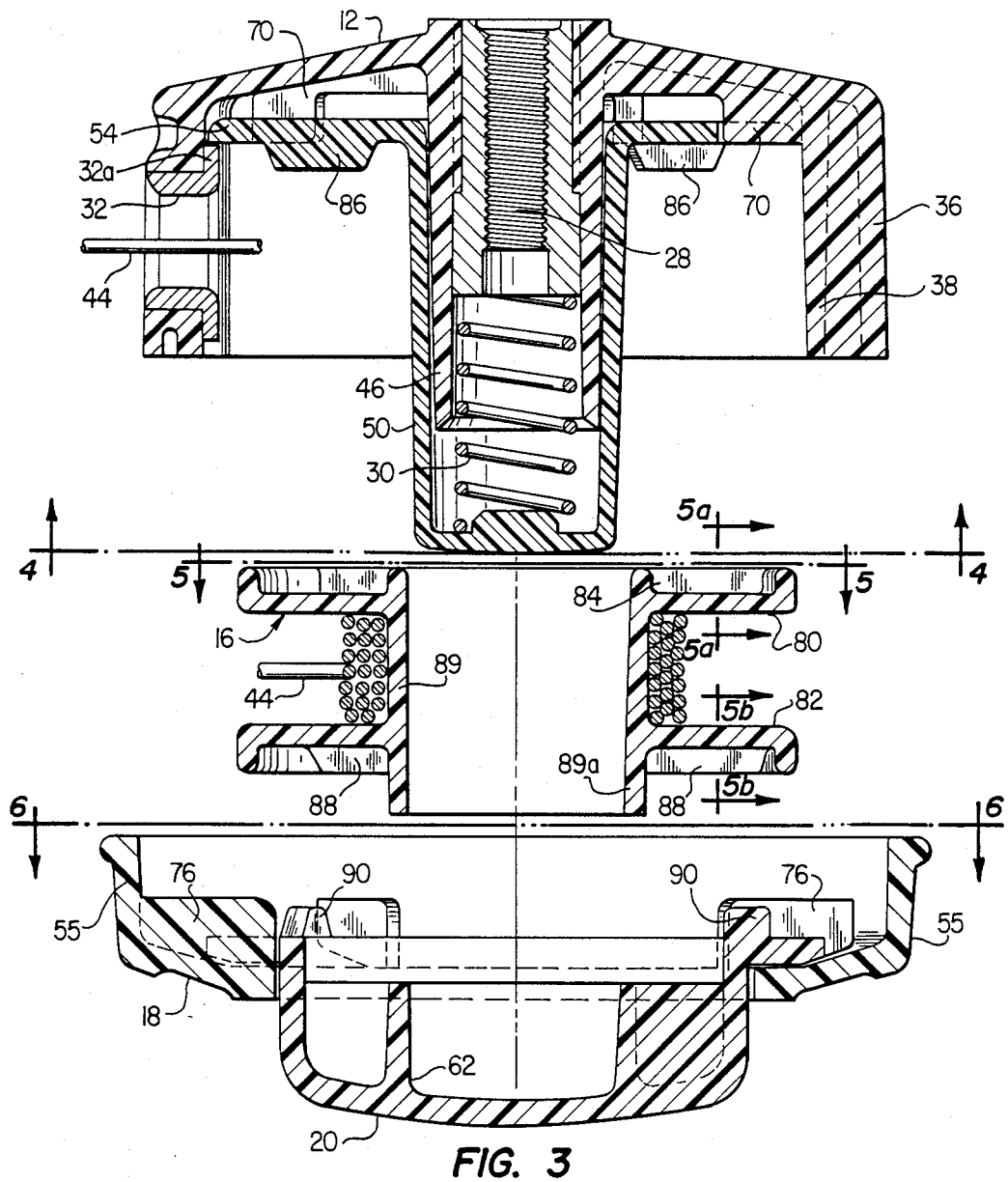
FIG. 3 is a longitudinal sectional view also taken substantially on lines 2—2 of FIG. 1, but exploded in the axial direction to illustrate its mode of assembly.
Figure 5A:
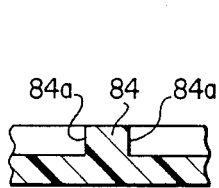
FIG. 5a is a sectional view taken substantially on lines 5a—5a of FIG. 5.
Figure 5:
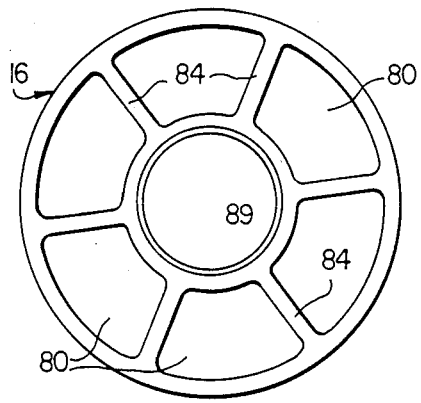
FIG. 5 is a plan view of the spool illustrated in the exploded view of FIG. 3, the vantage point being represented by line 5—5 on FIG. 3.

As can best be seen in FIG. 5, the spool 16 has six radially extending ribs 84 on the upper surface of the upper flange 80 extending between a central hub portion 89 in the outer peripheral upturned portion of flange 80. A corresponding number of lower ribs 88 are provided on the lower face of the lower flanges 87 of the spool, and are conveniently placed in the same angular position. Of course, the ribs on the spool could be offset and the locking teeth 86 angularly aligned with the control teeth 90. The spool 16 has an extension 89a of the hub 89 which extends significantly below the lower flange 82 and the ribs 88 to permit the operator to more easily grasp and extract the spool from the housing during its disassembly, as shown in FIG. 3.

Figure 5B:
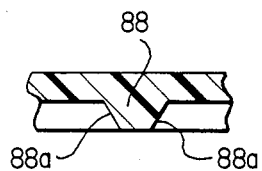
FIG. 5b is a sectional view taken substantially on lines 5b—5b of FIG. 5.

The edges 84a of the radially extending locking ribs 84 are preferably substantially parallel to the axis of the spool to provide a good locking surface, as best seen in FIG. 5a. Similarly, the upper locking plate member 14 has six downwardly projecting surfaces or bosses which form locking teeth 86 which are adapted to engage the locking ribs 84 with mating faces parallel to the faces 84a of the spool to prevent rotation of the spool during normal operation when the locking plate is in the lower position. Similarly, the button member 20 has six upstanding bosses which form what are herein termed escapement control teeth 90 disposed around the periphery of the button member 20. The escapement control teeth 90 may have tapered edges 90a (see FIG. 6) on each side to minimize friction when engaging correspondingly tapered faces 88a (see FIG. 5b) as the button 20 is urged back toward the lower locking position by the spring as will presently be described.

Figure 7:
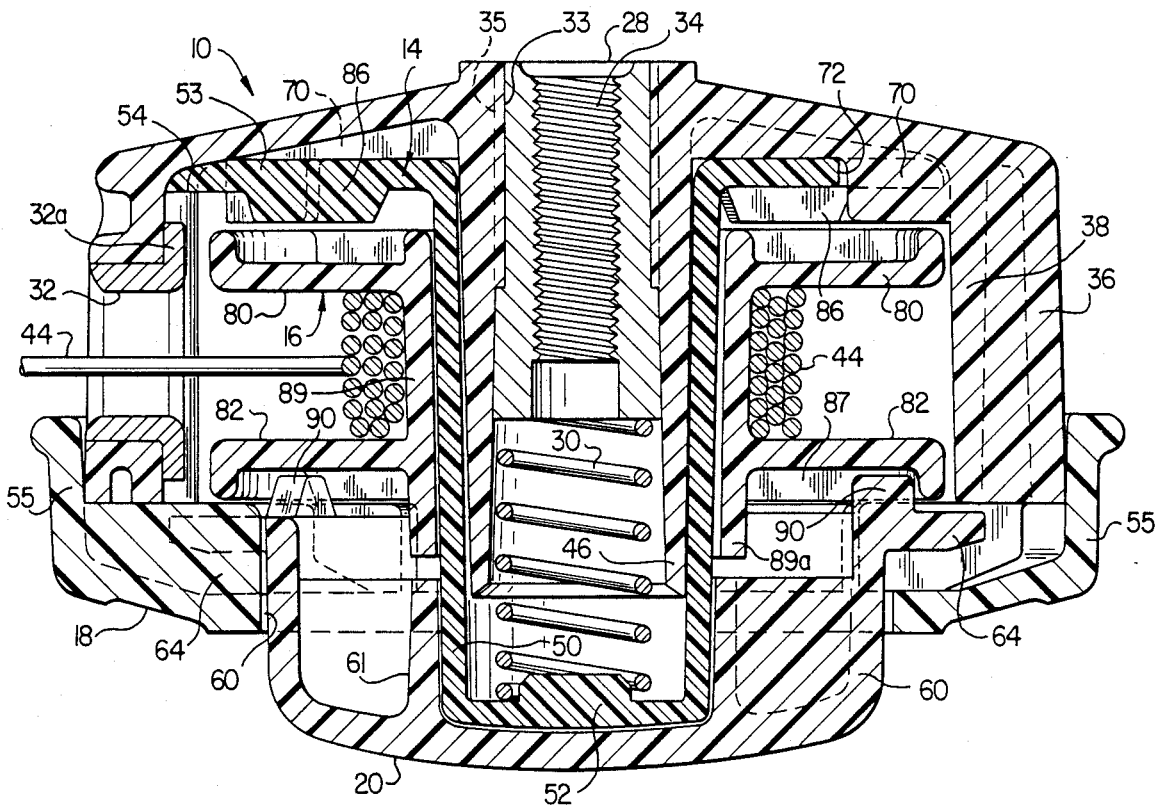
FIG. 7 is a longitudinal sectional view taken on the same lines as FIG. 2, with the ground engaging button member, and the locking plate and cup member shifted upwardly to initiate indexing of the spool as a result of the button member being bumped against the ground.

The spacing between the upper locking teeth 86 and the lower escapement teeth 90 provided by the length of the cup portion 50 is such that either the locking teeth 86 or the escapement teeth 90 are always in position to engage either the upper ribs 84 or lower ribs 88 of the spool 16. When the spring has urged the cup 50 and therefore the button member 20 to the lowermost position illustrated in FIG. 2 so that the flange 64 is engaging the cover 18, the locking teeth 86 engage the ribs 88 on the top of the spool 20. Conversely, when the button 20 is bumped against the ground to move the assembly into the position illustrated in FIG. 7 so that the locking teeth 86 are moved above the ribs 84, the escapement teeth 90 will have moved into an interfering position relative to the lower ribs 88. When the cover 18 is connected to the housing 12, the locking teeth 86 are spaced at 60 degree intervals, and as shown in FIG. 4, may conveniently be described as being at odd number clock positions of one, three, five, seven, nine and eleven, while the escapement teeth 90 which are also placed at 60 degree intervals, but offset 30 degrees from the teeth 86, corresponding to even numbered clock positions of two, four, six, eight, ten and twelve. These relationships are generally illustrated in FIGS. 4 and 6.

As previously mentioned, the head 10 is comprised of five injection molded plastic parts and three metallic parts. These parts are simple and economically fabricated and may be quickly and easily assembled in the manufacturing process by first inserting the arbor 28 in the housing member 12. If desired, the arbor can be molded in the housing at the time the housing member 12 is fabricated, or may be pressed in as a secondary operation. Next, the spring 30 is inserted in the spring chamber formed by wall 46 and the locking plate and cup assembly 14 telescoped over the spring chamber wall 46 so that the spring is slightly compressed to permit the eyelet 32 to be inserted. At this point, the tab 54 engages the flange of the eyelet 32 and the friction fit of the eyelet 32 within the opening in the housing 12 ensures that the assembled four components will not come apart. Next the line from the spool 16 is threaded through the eyelet 32 and the spool merely slipped over the cup portion 50 of the member 14. This is facilitated because of the clearance between the periphery of the spool 16 and the flange of eyelet 32 which provides increased clearance as compared to the lesser clearance between the periphery of the spool 16 and the interior surface of the interior wall 38 of the housing, which minimum clearance is required to ensure that the line does not become wedged between the spool and the housing. During the insertion of the spool, the assembler is not concerned with the force of the spring or the possible disassembly of the housing and the locking plate and cup member 14. The assembly is completed merely by placing the button 20 within the cover 18 and pressing the cover over the tabs 56 into the openings 60 to bias locking tab 62 inwardly, then rotating the tabs 62 into the grooves 58. The resulting assembly is best illustrated in the normal operating position shown in FIG. 2, and in the bumped position in FIG. 7.

Figure 2:
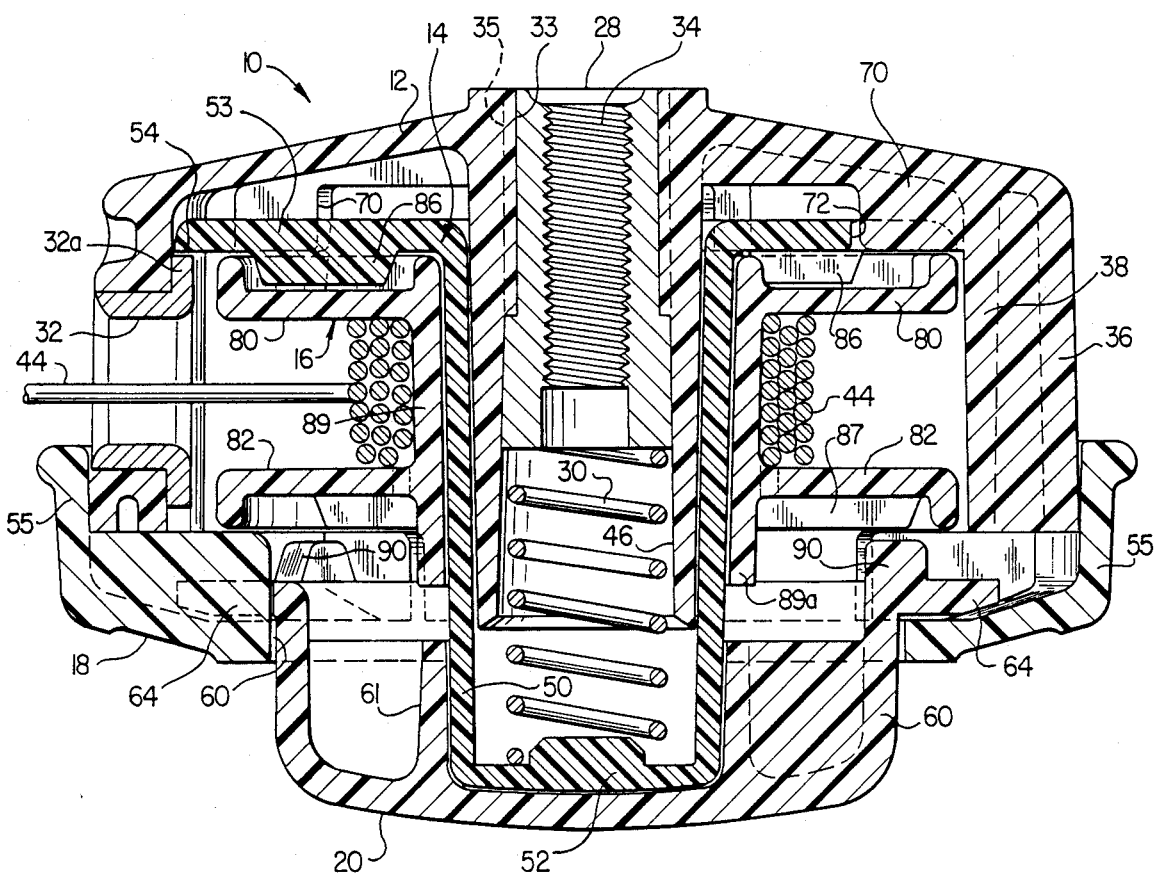
FIG. 2 is a section view taken substantially on lines 2—2 of FIG. 1.

In normal operation, the head 10 is in the condition best illustrated in FIG. 2. In this condition, the spring 30 urges the member 14 downwardly against the button member 20 until the flange 64 of the button abuts against the cover member 18. The tension force side of this loop is completed through the coupling between the cover member and the housing 12 provided by the flanges 56 and grooves 58. In this position, the spool 16 is retained against downward axial movement by the ribs 76 in the cover member 18 so that the locking teeth 86 engage the upper ribs 84 on the spool and prevent rotation of the spool. The abutting faces of the ribs 84 and locking teeth 86 are both substantially parallel to the axis of the head so that there is no camming force tending to force the locking plate and cup member upwardly against the bias of the spring 30, thus assuring that no line will be payed out regardless of any unusual forces exerted on the line such as some times occur when the line becomes entangled in an immovable object.

When the line becomes worn or broken so that it is desirable to replenish the length of cutting line extending from the head, the operator merely bumps the head against the ground to shift the button 20 and locking plate and cup member 14 upwardly against the bias of the spring 30. As soon as the locking teeth 86 have cleared the ribs 84 on the top of the spool 16, the spool is free to rotate under the tension in the line resulting from centrifugal force or forces created by line contact with grass or similar vegetation. Since this force is substantial, the rotation of the spool is extremely rapid and far exceeds the ability of the spring 30 to return the locking teeth 86 into interfering position with the ribs 84. However, before the teeth 86 clear the ribs 84, the escapement teeth 90 have been moved upwardly to interfere with the rotation of the ribs 88 on the lower flange of the spool so that the spool cannot rotate more than 30 degrees before engaging the escapement teeth 90. The force of the spring 30 is sufficient that it causes the head to bounce upwardly, thus assuring that the button 20 is continually in contact with the locking plate and cup member so that the locking teeth 86 and the escapement teeth 90 maintain the appropriate spacing. Also, the tapered teeth in the lower flange of the spool and the tapered escapement teeth help to move the locking cup downwards once the tapping action is over. As the head rebounds from the ground, the spring forces the locking plate and cup member 14 and button 20 downwardly to disengage the escapement teeth 90 from the ribs 88 on the lower flange of the spool. Since the spacing between the two sets of teeth is maintained, the locking teeth move into an interfering relationship with the upper ribs 84 on the spool before the escapement teeth 90 release the lorer ribs 88 on the spool. The spool is then free to index an aditional 30 degrees until the ribs 84 again engage the teeth 86, thus providing a total of 60 degrees of spool rotation for each bump cycle. The bump cycle can be repeated as often as desired by the operator to feed the desired increments of line. If desired, a conventional blade (not shown) may be provided on the shield to trim the line to a maximum length if the operator should advance an excessive length of line.

In order to replace the line, the operator need only press the locking tab 62 inwardly so that the cover plate can be rotated until the tabs 56 leave the grooves 58 at which point the cover 18 and button 20 are removed to expose the spool 16. The extend hub portion 86a of the spool 16 may be grasped by the user to conveniently remove the spool from the housing assembly. At this time, eyelet 32 again holds the locking plate and cup member 14 in position when the tab 54 engages the flange of the eyelet 32, thus ensuring that the operator does not disassemble the member 14 and spring from the housing member. A new supply of line may be wound on the spool by the user, or the user may purchase a new spool already wound with the appropriate length of line. As during assembly at the factory, the line may be threaded through the eyelet 32 and the spool placed in position without fighting the bias of the spring 30 or the need to simultaneously assemble multiple parts. The cover 18 and button 20 may then be placed over the spool and use of the device resumed.

It is evident that because of the symmetry of the ribs on the spool 16 and the symmetry of the locking teeth 86 and escapement teeth 90, except for the 30 degree offset, the head assembly will function with the line wound in either direction upon the spool, or with the head being driven by the prime mover in either direction. As a result, a single set of tooling may be used for all of the components except the arbor 28, in which the direction of the threads 34 would most appropriately be opposite to the direction of rotation so that normal operation would tend to continually tighten the coupling.

Figures 8A, 8B:
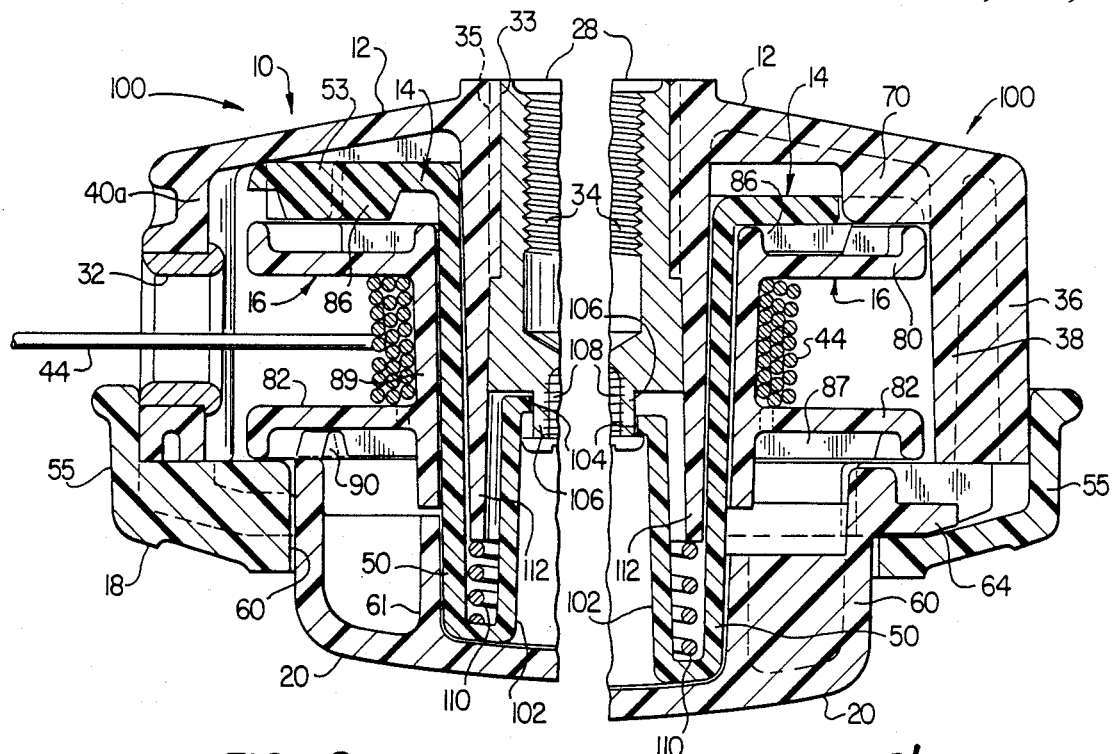
FIGS. 8a and 8b are longitudinal sectional view of an alternative embodiment of a head in accordance with the present invention, with FIG. 8A illustrating the head in the bumped position and FIG. 8B illustrating the head in the normal running position.

Referring now to FIGS. 8a and 8b, another embodiment of a head in accordance with the present invention is indicated generally by the reference numeral 100. The head 100 utilizes components which are the same as those previously described in connection with head 10 except that the extended flange 32a of the eyelet 32 and the tab 54 of the locking plate 53 are eliminated. Additionally, the cup 50 of the member 14 is modified by providing an upwardly extending boss 102 which conveniently extends upwardly to a point near the end of the arbor 28 and to form a peripheral shoulder 104 around an axially aligned opening. The arbor 28 has an extension 106 which extends through the opening defined by shoulder 104 and is sized to slide relative to the shoulder 104. A screw 108 is threaded into the extension 106 and includes a head larger than the opening in the shoulder 104. Additionally, the spring 110 is larger in diameter and shortened so as to engage the lower end of the wall 112 of the housing 12. The spring 110 is held in centered relationship so as to engage the lower end of wall 112 by having an outside diameter approximating the minimum internal diameter of the cup wall 50 which is slightly tapered for mold draft purposes.

In the assembly sequence of head 100, the eyelet 32 can be placed in the housing 12 prior to assembly of the locking plate and cup member 14 with the housing. Then the spring 110 may be placed in the cup portion 50 and the locking plate and cup member 14 pushed into position with the opening in shoulder 104 over the axial extension 106. The screw 108 may then be threaded into place so that the head of the screw will retain the locking plate and cup member 14 substantially in the operating position shown in the right-hand FIG. 8b, even when the locking ring cover 18 and button member 20 are not assembled on the housing. When the locking ring 18 and button 20 are assembled and the unit is in operation, the locking plate and cup member 12 can be reciprocated upwardly into the position illustrated in FIG. 8a as the shoulder 104 moves along the extension 106, to permit indexing of the spool 16 as heretofore described.

Figures 9A, 9B:
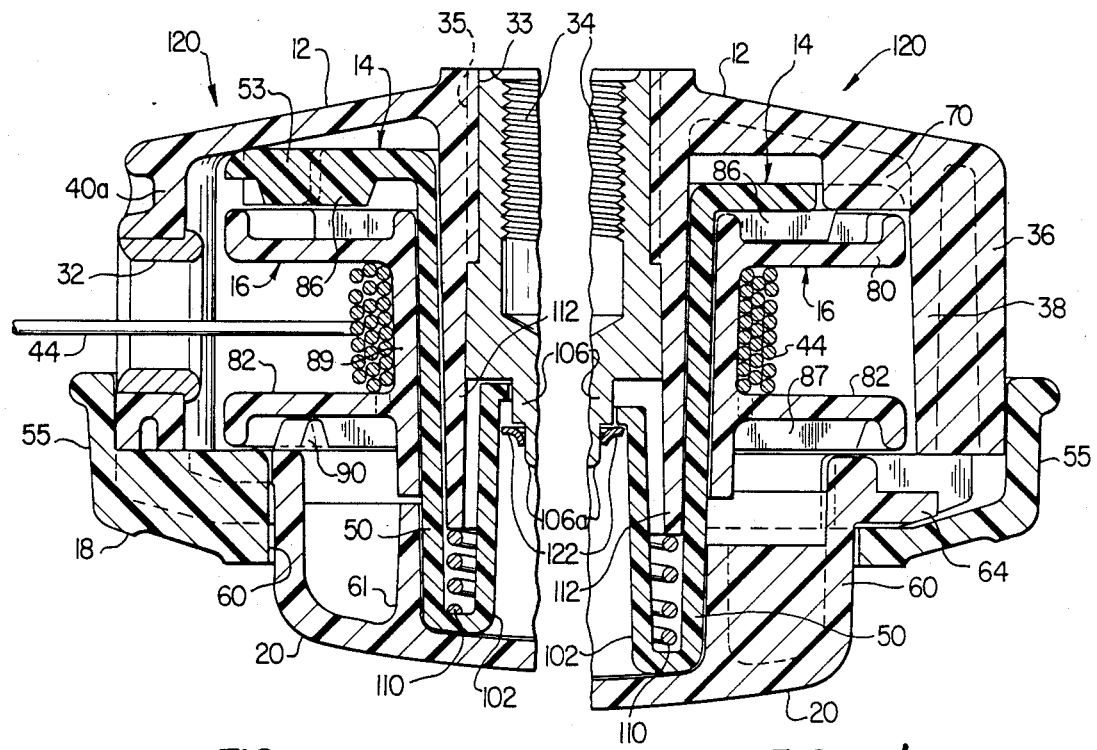
FIGS. 9a and 9b are longitudinal sectional views of still another alternative embodiment of a head in accordance with the present invention, with FIG. 9a illustrating the head in the bumped position and FIG. 9b illustrating the head in the normal running position.

A further embodiment of the invention is indicated generally by the reference numeral 120 in FIGS. 9a and 9b. The device 120 is substantially identical to the device 100 of FIGS. 8a and 8b, and corresponding components are accordingly designated by the same reference numerals. The primary variation is that the boss 106 of the arbor is provided with an extension 106a of smaller diameter, and a conventional push nut 122 is used in combination with the extension 106a to replace the screw 108. Since it is intended that the user of the device 120 never disassemble the locking plate and cup member 14 from the housing 12, the permanent, non-replaceable locking nut 122 can be used to substantially expedite assembly while simultaneously reducing component cost. This is particularly true in that the spring 110 may be sized to exert minimum force on the push nut 122. Further, during normal use when repetitive pounding which would otherwise be applied to the push nut 122, the combination of the button member 20 and the cover ring 18 arrest the downward movement of the locking plate and cup member 12 before the shoulder 104 engages the push nut. As a result, the simple structure push nut can be used to function only in the static situation attending replacement of the line when it would otherwise not be satisfactory for the severe dynamic conditions to which the device is exposed in normal use.

The heads described and illustrated are specifically adapted for use with gasoline powered prime movers which drive the heads through a flexible drive shaft. However, the heads are equally useful in electric powered line trimmers merely by changing the arbor to be connected to the drive shaft of the motor. It is also desirable in some instances to mold fins on the upper surface of the housing member to form a centrifugal fan for cooling the electric motor in the conventional manner.

Although preferred embodiments of the invention have been described in detail, it will be appreciated that various changes, substitutions, and alterations can be made therein without departing from the spirit and scope of the invention as defined by the appended claims.

What is claimed is:

1. A head assembly for a flexible line trimmer comprising:
    housing means having upper and lower members, one of the members having a generally cylindrical sidewall with a least one aperture formed therein, and being releasably coupled to the other member to gain access to the interor of the housing:
    means for coupling the upper housing member to a drive shaft for rotation about an axis;
    locking means rotatably driven by the housing means, the locking means being reciprocable relative to the housing means between upper and lower positions;
    spring means disposed between the upper member of the housing means and the locking means urging the locking means into the lower position;
    spool means containing a supply of flexible cutting line disposed in the housing means, the spool means being restrained from axial movement relative to the housing means;
    a supply of cutting line wound on the spool with the free end extending through the aperture in the housing means into a cutting plane when the head assembly is rotated at high speed;
    cooperating means disposed on the locking means and on the spool means for locking the spool against rotation relative to the housing when the locking means is in the lower position and for permitting a first predetermined increment of relative rotation as the locking means is moved from the lower position to the upper position and a second predetermined increment of the relative rotation as the locking means is moved from the upper position back to the lower position;
    the locking means including ground bumping means protruding from the bottom of the housing means for shifting the locking means from the lower position to the upper position when the operator bumps the head assembly against the ground and to be returned by the force of the spring to the lower position to allow the spool to rotate through the first and second increments of rotation in response to centrifugal force on the line extending through the aperture into the cutting plane to thereby payout a controlled increment of line; and
    the locking means being separable into upper and lower members by the operator to permit the spool to be removed for replacing a new supply of line, the spring means being disposed between the upper member of the locking means and the upper member of the housing means.

2. The head assembly of claim 1 further including:
    retaining means for retaining the upper members of said housing means and said locking means in assembled condition with the spring means therebetween when the lower members of said housing means and said locking means are respectively separated from the upper members of said housing means and said locking means.

3. The head assembly of claim 2 wherein the retaining means comprises means on the housing means interfering with excessive axial movement of the upper locking means.

4. The head assembly of claim 3 wherein the retaining means comprises an interference between a metallic eyelet forming the aperture and the upper locking member.

5. The head assembly of claim 3 wherein the retaining means comprises extension means connected to the housing means and an aperture in the upper locking means, the extension means extending through the aperture and including an enlarged portion greater in size than the aperture and being affixable to the housing means after assembly of the upper locking means and spring in operative position relative to the housing means.

6. The head assembly of claim 5 wherein the enlarged portion comprises the head of a screw.

7. The head assembly of claim 5 wherein the enlarged portion comprises a push nut.

8. The head assembly of claim 1 wherein the upper member of the locking means is driven by axially extending upper ribs formed in the upper housing members and cooperating grooves formed in the upper member of the locking means.

9. The head assembly of claim 2 wherein the lower member of the locking means is driven by axially extending lower ribs formed in the upper housing members and cooperating grooves formed in the lower member of the locking means.

10. The head assembly of claim 9 wherein the lower ends of the upper ribs and the upper ends of the lower ribs are axially spaced, when the housing members are assembled to restrain axial movement of the spool.

11. The head assembly of claim 1 wherein
the locking means comprises an upper member having an upper locking plate disposed above the spool with a plurality of downwardly projecting locking teeth means and a lower member for engaging the ground having a plurality of upwardly projecting escapement teeth means; and
the spool comprises a cylindrical hub and upper and lower radially extending flanges having upwardly and downwardly projecting rib means for alternately cooperatively engaging the locking teeth means and escapement teeth means as the locking means is reciprocated from the lower position to the upper position and back to the lower position to control line payout.

12. The head assembly of claim 11 wherein the spool further includes an extension of the hub below the lower flange facilitating grasping by the operator for removing the spool from the operative position when the lower members are separated from the upper members.

13. A head assembly for a flexible line trimmer comprising:
a housing member having an upper endwall, means for connecting the upper endwall to a drive shaft for rotation about an axis of rotation, and an inner cylindrical wall coaxial with the axis forming a chamber for a coil spring;
locking means having a cup section disposed around the inner cylindrical wall for axial reciprocation between upper and lower positions relative to the housing member and having a closed lower end;
spring means disposed between the locking means and the housing member for biasing the locking means to the lower position;
means carried by the housing member for retaining the locking means on the inner cylindrical wall to contain the spring within the chamber;
a spool having a hub disposed around the cup section of the locking means and having parallel upper and lower flanges extending radially outwardly from the hub;
a cover member having a central opening therein removably connectable to the lower open end of the housing member;
a supply of cutting line wound on the spool and extending through an aperture in one of the members into a cutting plane;
button means extending through the control opening for, in response to bumping the ground, moving the locking member from the lower position to the upper position against the bias of the spring, means for transmitting torque from the housing member to the locking member while permitting the locking member to reciprocate between the lower and upper positions; and
cooperative means on the locking means and the spool for permitting a predetermined increment of rotation of the spool relative to the housing member as the locking means is reciprocated from the lower position to the upper position as a result of the button members being bumped against the ground by the operator.

14. A head assembly for a flexible line trimmer comprising:
a housing member having an outer cylindrical wall closed at the upper end by an upper endwall and an open lower end, means for connecting the upper endwall to a drive shaft for rotation about the axis of the cylindrical wall, an inner cylindrical wall coaxial with the outer cylindrical wall;
a locking member having a locking plate and a cup section disposed below the plate and around the inner cylindrical wall for axial reciprocation between upper and lower positions relative to the housing member and having a closed lower end;
spring means disposed within the inner wall between the locking member and the housing member for biasing the locking member to the lower position;
means carried by the housing member for retaining the locking member on the housing member to contain the spring within the chamber;
a spool having a hub disposed around the cup section of the locking member below the locking plate, and having parallel upper and lower flanges extending radially outwardly from the hub to form the spool;
a cover member having a central opening therein removably connectable to the lower open end of the housing member;
a button member extending through the control opening having a peripheral, radially extending flange disposed above the cover member for retaining the button member within the head in a lower position against the lower end of the locking member while permitting the button member, in response to bumping the ground, to move from the lower position to an upper position in which the locking member has been moved against the bias of the spring to its upper position;
longitudinally extending rib means within the housing member cooperating with grooves on the periphery of the locking plate for transmitting torque from the housing member to the locking member while permitting the locking member to reciprocate between the lower and upper positions;
longitudinally extending rib means carried by the cover member cooperating with grooves in the periphery of the periphical flanges of the button member for transmitting torque from the cover member to the button member while permitting the button member to reciprocate between the lower and upper positions;
upper and lower rib means formed on the upper and lower flanges of the spool;
locking teeth means on the lower surface of the locking plate for engaging the upper rib means;
escapement teeth means formed on the upper surface of the button member for engaging the lower rib means;
the locking teeth means being axially and circumferentially spaced relative to the escapement teeth means for permitting a predetermined increment of rotation of the spool relative to the housing member as the locking member and button member are reciprocated from the lower positions to the upper positions as a result of the button member being bumped against the ground.

15. A spool for a head assembly of a flexible line trimmer, the head comprising a housing member having an outer cylindrical wall closed at the upper end by an upper endwall and an open lower end, means for connecting the upper endwall to a drive shaft for rotation about the axis of the cylindrical wall, an inner cylindrical wall coaxial with the outer cylindrical wall;

a locking member having a locking plate and a cup section disposed below the plate and around the inner cylindrical wall for axial reciprocation between upper and lower positions relative to the housing member and having a closed lower end;

spring means disposed within the inner cylindrical wall between the locking member and the housing member for biasing the locking member to the lower position;

means carried by the housing member for retaining the locking member on the housing member to contain the spring within the chamber;

a cover member having a central opening therein removably connectable to the lower open end of the housing member;

a button member extending through the control opening having a peripheral, radially extending flange disposed above the cover member for retaining the button member within the head in a lower position against the lower end of the locking member while permitting the button member, in response to bumping the ground, to move from the lower position to an upper position in which the locking member has been moved against the bias of the spring to its upper position;

upper longitudinally extending rib means within the housing member cooperating with grooves on the periphery of the locking plate for transmitting torque from the housing member to the locking member while permitting the locking member to reciprocate between the lower and upper positions;

lower longitudinally extending rib means carried by the cover member cooperating with grooves in the periphery of the periphical flanges of the button member for transmitting torque from the cover member to the button member while permitting the button member to reciprocate between the lower and upper positions;

locking teeth means on the lower surface of the locking plate for engaging rib means on the upper surface of a spool disposed around the cup section;

escapement teeth means formed on the upper surface of the button member for engaging rib means on the lower surface of a spool disposed around the cup section;

said spool comprising a hub for disposition around the cup means, and having parallel upper and lower flanges extending radially outwardly from the hub to form a spool, the upper and lower flanges terminating in smooth edges positioned to be engaged by the ends of the upper and lower longitudinally extending rib means to prevent axial movement of the spool while permitting rotational movement, and upper and lower rib means on the upper and lower surfaces of the upper and lower flanges for interacting with the locking teeth means and the escapement teeth means, respectively, for permitting a predetermined increment of rotation of the spool relative to the housing member as the locking member and button member are reciprocated from the lower positions to the upper portions as a result of the button member being bumped against the ground.

16. The spool of claim 15 wherein the hub extends substantially beyond one of the flanges a distance to permit the user to grasp the extended portion to facilitate removal of the spool from the head.

17. The spool of claim 15 wherein the faces of the upper rib means which cooperatively engage the locking teeth means are substantially parallel to the axis of the spool.

18. The spool of claim 15 wherein the faces of the lower rib means which cooperatively engage the escapement teeth means are inclined to the axis of rotation to enhance return of the locking member to the upper position.

* * * * *